(12) United States Patent
Stoddard et al.

(10) Patent No.: US 11,679,859 B2
(45) Date of Patent: Jun. 20, 2023

(54) AIRCRAFT FUSELAGE LONGITUDINAL SPLICE FOR JOINING HALF BARREL FUSELAGE SECTIONS AND OTHER SPLICED FUSELAGE SECTIONS

(71) Applicant: The Boeing Company, Chicago, IL (US)

(72) Inventors: Zachary N. Stoddard, Mukilteo, WA (US); Ronald L McGhee, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 22 days.

(21) Appl. No.: 17/484,043

(22) Filed: Sep. 24, 2021

(65) Prior Publication Data

US 2022/0097818 A1    Mar. 31, 2022

Related U.S. Application Data

(60) Provisional application No. 63/085,449, filed on Sep. 30, 2020.

(51) Int. Cl.
| | |
|---|---|
| *B64C 1/06* | (2006.01) |
| *B64F 5/10* | (2017.01) |
| *B64C 1/14* | (2006.01) |
| *B64C 1/18* | (2006.01) |

(52) U.S. Cl.
CPC .............. *B64C 1/069* (2013.01); *B64C 1/064* (2013.01); *B64C 1/1484* (2013.01); *B64C 1/18* (2013.01); *B64F 5/10* (2017.01)

(58) Field of Classification Search
CPC ................................ B64C 1/069; B64C 1/068
See application file for complete search history.

(56) References Cited

U.S. PATENT DOCUMENTS

| | | | |
|---|---|---|---|
| 2009/0277994 A1 | 11/2009 | Lobato et al. | |
| 2014/0001311 A1* | 1/2014 | Dopker | B64C 1/069 156/182 |
| 2018/0065761 A1 | 3/2018 | Staal et al. | |

* cited by examiner

*Primary Examiner* — Timothy D Collins
*Assistant Examiner* — Eric Acosta
(74) *Attorney, Agent, or Firm* — Quinn IP Law

(57) ABSTRACT

An aircraft fuselage body is constructed of an upper body section having a curved cross-section configuration and a lower body section having a curved cross-section configuration. The upper body section and the lower body section are joined together to form an aircraft fuselage body by splice straps that are secured, end to end along interior surfaces of the upper body section and the lower body section. The aircraft fuselage body being constructed of an upper body section and a lower body section enables installation of systems separately into the upper body section and the lower body section prior to the upper body section and lower body section being joined together.

20 Claims, 4 Drawing Sheets

AIRCRAFT FUSELAGE LONGITUDINAL SPLICE FOR JOINING HALF BARREL FUSELAGE SECTIONS AND OTHER SPLICED FUSELAGE SECTIONS

CROSS-REFERENCE TO RELATED APPLICATIONS

This application claims priority to U.S. App. No. 63/085,449 filed Sep. 30, 2020, which is entitled "AIRCRAFT FUSELAGE LONGITUDINAL SPLICE FOR JOINING HALF BARREL FUSELAGE SECTIONS AND OTHER SPLICED FUSELAGE SECTIONS" and which is incorporated herein by reference.

FIELD

This disclosure pertains to the construction of an aircraft fuselage body. More specifically, this disclosure pertains to an aircraft fuselage body constructed of an upper body section having a curved cross-section configuration and a lower body section having a curved cross-section configuration. The upper body section and the lower body section are joined together to form an aircraft fuselage body by splice straps that are secured, end to end along interior surfaces of the upper body section and the lower body section. The aircraft fuselage body being constructed of an upper body section and a lower body section enables installation of systems separately into the upper body section and the lower body section. The installation of the systems separately into the upper body section and the lower body section is more simplified than the installation of systems into a one-piece, barrel configuration of an aircraft body fuselage.

BACKGROUND

In the construction of aircraft, the aircraft fuselage body is often constructed of layers or skins of composite material that are laid up in a general cylindrical or barrel configuration. The one piece barrel configuration of the aircraft fuselage body provides the fuselage with structural strength. However, there are some manufacturing disadvantages associated with the one piece barrel configuration.

The one piece barrel configuration complicates many assembly and integration manufacturing steps conducted inside the barrel configuration. The manufacturing steps conducted inside the barrel configuration are difficult to complete, and therefore require more time to complete.

For example, the passenger floor grid and supported aircraft systems constructed to the underside of the passenger floor grid are inserted as one piece into the interior of the barrel configuration from one end of the barrel configuration. The passenger floor grid and the supported aircraft systems are then lowered inside the barrel configuration to a position where the passenger floor grid is assembled to the interior of the barrel configuration. The opposite ends of the floor beams of the floor grid are assembled to circular frames that extend around the interior surface of the fuselage from beneath the floor surface. Stanchions projecting downwardly from the floor grid are also connected to the frames. The connections between the modular floor grid and the frames extending around the interior surface of the fuselage are often accomplished by separate fittings installed beneath the floor surface. The separate fittings are a significant part of the overall weight of the passenger floor grid and the installation of the fittings contributes significantly to the manufacturing time required to assemble the floor grid and floor surface inside the barrel configuration.

SUMMARY

The aircraft fuselage body of this disclosure is constructed in two sections, an upper body section and a lower body section. Constructing the aircraft fuselage body of an upper body section and a lower body section facilitates access to the interior surfaces of the upper body section and the lower body section. The access to the interior surfaces of the upper body section and the lower body section enables faster fuselage assembly. For example, the passenger floor grid can be installed onto the interior surface of the lower body section in a drop in manner, instead of the modular passenger floor grid being slid into the barrel configuration of the fuselage from one end of the barrel configuration. Additionally, providing access to the interior surface of the lower body section enables a direct floor beam to frame joint connection, eliminating the need for separate joint fittings to join the floor grid frame to the frames on the interior surface of the fuselage.

The upper body section has a curved cross-section configuration that extends between a right side bottom edge surface of the upper body section and a left side bottom edge surface of the upper body section. The lower body section also has a curved cross-section configuration that extends between a right side top edge surface of the lower body section and a left side top edge surface of the lower body section.

In assembling the upper body section to the lower body section, the right side bottom edge surface of the upper body section is positioned above and opposing the right side top edge surface of the lower body section. In a like manner, the left side bottom edge surface of the upper body section is positioned above and opposing the left side top edge surface of the lower body section. In these relative positions of the upper body section and the lower body section, the upper body section and the lower body section are brought together.

A plurality of splice straps are positioned along the interior surfaces of the upper body section and the lower body section and are secured between the upper body section and the lower body section. The plurality of splice straps are positioned extending across the right side bottom edge surface of the upper body section and the right side top edge surface of the lower body section, and extending across the left side bottom edge surface of the upper body section and the left side top edge surface of the lower body section.

A plurality of window openings extend through the upper body section. The plurality of window openings are positioned above the plurality of splice straps.

A floor surface is connected to the interior surface of the lower body section. The floor surface extends across the curved configuration of the lower body section below the plurality of splice straps.

There are upper stringers secured to the interior surface of the upper body section. The upper stringers have lengths that extend across the interior surface of the upper body section between the plurality of splice straps secured to the interior surface of the upper body section and the plurality of window openings. The upper stringers have flanges secured to the interior surface of the upper body section. The plurality of splice straps are secured to the flanges with the flanges positioned between the plurality of splice straps and the interior surface of the upper body section.

There are lower stringers secured to the interior surface of the lower body section. The lower stringers have lengths that extend across the interior surface of the lower body section between the plurality of splice straps secured to the interior surface of the lower body section and the floor surface. The lower stringers have flanges secured to the interior surface of the lower body section. The plurality of splice straps are secured to the flanges of the lower stringers with the flanges of the lower stringers positioned between the plurality of splice straps and the interior surface of the lower body section.

Each splice strap of the plurality of splice straps has a length dimension. The length dimensions of the plurality of splice straps are positioned end to end with the plurality of splice straps extending along the right side bottom edge surface of the upper body section and the right side top edge surface of the lower body section, and extending along the left side bottom edge surface of the upper body section and the left side top edge surface of the lower body section.

Pluralities of fasteners extend through the plurality of splice straps, through the upper body section and through the lower body section. The pluralities of fasteners connect the plurality of splice straps between the upper body section and the lower body section.

The features, functions and advantages that have been discussed can be achieved independently in various embodiments or may be combined in yet other embodiments, further details of which can be seen with reference to the following description and drawings.

DETAILED DESCRIPTION

Figure 1:
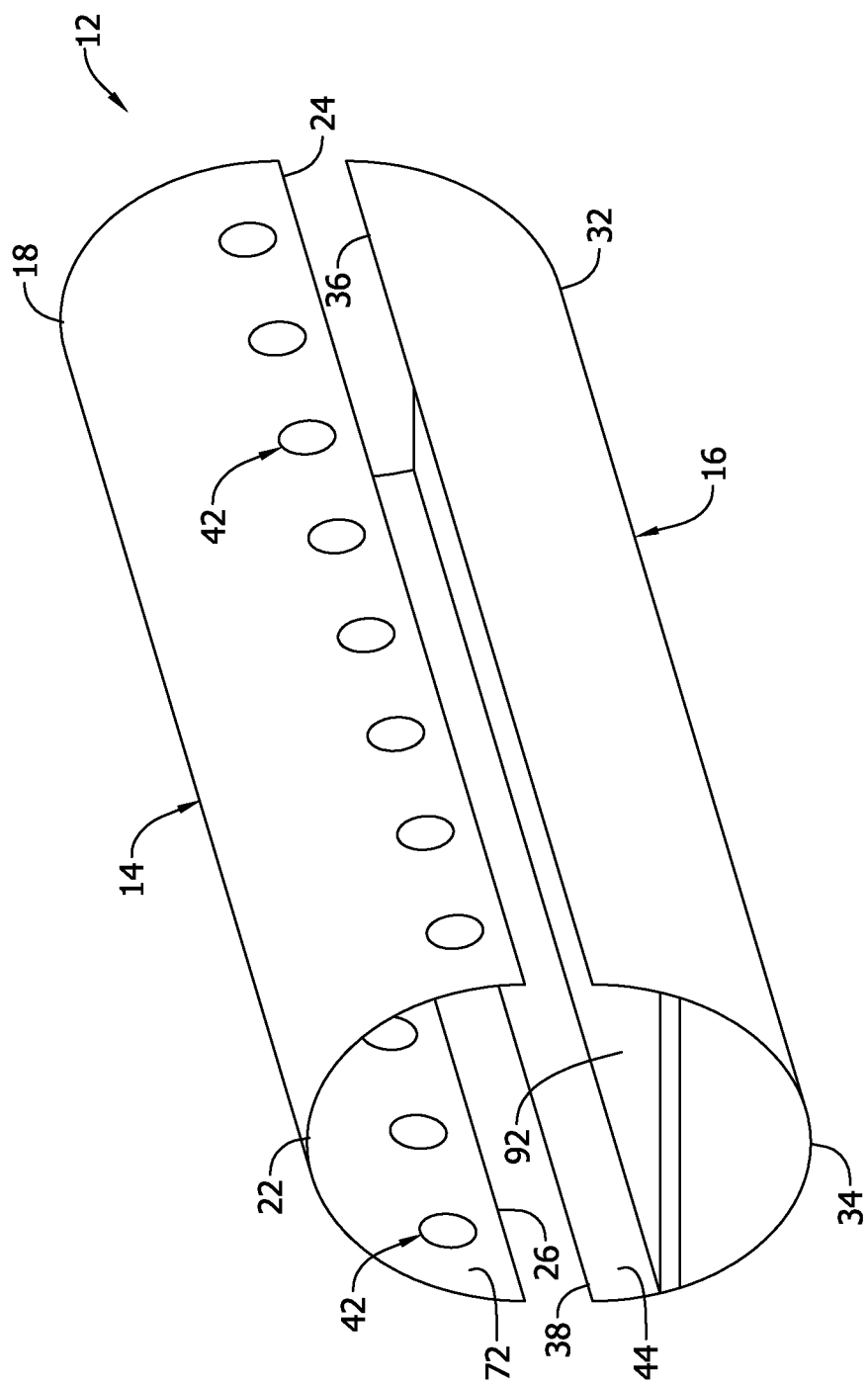
FIG. 1 is a representation of a perspective view of an upper body section and a lower body section of an aircraft fuselage.

FIG. 1 is a representation of a perspective view of an aircraft body section 12 constructed of an upper body section 14 and a lower body section 16. The aircraft body section 12 or fuselage section represented in FIG. 1 is only a portion of a complete aircraft body. It should be understood that a complete aircraft body would be constructed of several aircraft body sections similar to that of FIG. 1. Additionally, the aircraft body section 12 in FIG. 1 is a representation of only an intermediate portion of a complete aircraft body or fuselage. It should be understood that the concepts described herein are not limited to an intermediate portion of an aircraft body or fuselage; but can be employed in the construction of any portion of an aircraft body, for example the tail of an aircraft body or the nose of an aircraft body.

The upper body section 14 and the lower body section 16 represented in FIG. 1 are constructed of multiple skins or layers of composite material that are laid up to form the upper body section 14 and lower body section 16. However, the aircraft body section 12 represented in FIG. 1 could be constructed of other equivalent materials, for example metals or other materials.

The upper body section 14 has a longitudinal length that extends between a forward edge 18 of the upper body section 14 and a rearward edge 22 of the upper body section 14. The upper body section 14 has a curved cross-section configuration that extends across the upper body section between a right side bottom edge surface 24 of the upper body section 14 and a left side bottom edge surface 26 of the upper body section 14. The right side bottom edge surface 24 and the left side bottom edge surface 26 of the upper body section 14 are planar surfaces. The upper body section 14 has a longitudinal length dimension between the forward edge 18 of the upper body section 14 and the rearward edge 22 of the upper body section 14. The upper body section 14 has a lateral width dimension between the right side bottom edge surface 24 of the upper body section and the left side bottom edge surface 26 of the upper body section. The longitudinal length dimension and the lateral width dimension are mutually perpendicular. The right side bottom edge surface 24 extends entirely along the longitudinal length dimension of the upper body section 14 and the left side bottom edge surface 26 extends entirely along the longitudinal length dimension of the upper body section 14. The curved cross-section configuration of the upper body section 14 extends laterally across the upper body section between the right side bottom edge surface 24 of the upper body section and the left side bottom edge surface 28 of the upper body section.

The lower body section 16 has a longitudinal length that extends between a forward edge 32 of the lower body section 16 and a rearward edge 34 of the lower body section 16. The lower body section 16 has a curved cross-section configuration that extends across the lower body section between a right side top edge surface 36 of the lower body section 16 and a left side top edge surface 38 of the lower body section 16. The right side top edge surface 38 and the left side top edge surface 38 of the lower body section 16 are planar surfaces. The lower body section 16 has a longitudinal length dimension between the forward edge 32 of the lower body section and the rearward edge 34 of the lower body section. The lower body section 16 has a lateral width dimension between the right side top edge surface 36 of the lower body section and the left side top edge surface 38 of the lower body section. The longitudinal length dimension and the lateral width dimension are mutually perpendicular. The right side top edge surface 38 extends entirely along the longitudinal length dimension of the lower body section 16 and the left side top edge surface 38 extends entirely along the longitudinal length dimension of the lower body section 16. The curved cross-section configuration of the lower body section 16 extends laterally across the lower body section between the right side top edge surface 36 of the lower body section and the left side top edge surface 38 of the lower body section.

In assembling the upper body section 14 to the lower body section 16, the two body sections are positioned relative to each other as represented in FIG. 1. The upper body section 14 is positioned directly above the lower body section 16.

The lower body section 16 can be positioned on a tooling fixture or cradle that is specifically designed to support the lower body section 16 in a stationary position as represented in FIG. 1. The upper body section 14 can be suspended by an overhead crane assembly that is specifically designed to suspend the upper body section 14 over the lower body section 16 as represented in FIG. 1. In the positions of the upper body section 14 and the lower body section 16, the right side bottom edge surface 24 of the upper body section 14 is positioned directly above and opposing the right side top edge surface 36 of the lower body section 16. The left side bottom edge surface 26 of the upper body section 14 is positioned directly above and opposing the left side top edge surface 38 of the lower body section 16. With the upper body section 14 and the lower body section 16 positioned relatively as represented in FIG. 1, the upper body section 14 is lowered down onto the lower body section 16. The right side bottom edge surface 24 of the upper body section 14 and the right side top edge surface 38 of the lower body section 16 are brought together, and the left side bottom edge surface 26 of the upper body section 14 and the left side top edge surface 38 of the lower body section 16 are brought together.

There are tolerance gaps between the right side bottom edge surface 24 of the upper body section 14 and the right side top edge surface 36 of the lower body section 16, and between the left side bottom edge surface 26 of the upper body section 14 and the left side top edge surface 38 of the lower body section 16. However, these gaps are filled with an adhesive, for example an aero sealant adhesive applied into the gaps on the exterior of the aircraft body 12 or fuselage, filling the gaps and establishing a smooth exterior surface on the exterior of the aircraft body 12.

As represented in FIG. 1, when the upper body section 14 and the lower body section 16 are brought together to form the aircraft body section 12, the aircraft body section 12 will have a cylindrical configuration. The cylindrical configuration of the aircraft body section 12 can have various different cross-section configurations. For example, the aircraft body section 12 could have an elliptical cross-section configuration or a circular cross-section configuration. Additionally, the aircraft body section 12 could have a rectangular cross-section configuration, a polygonal cross-section configuration, or various other equivalent cross-section configurations.

Figure 2:
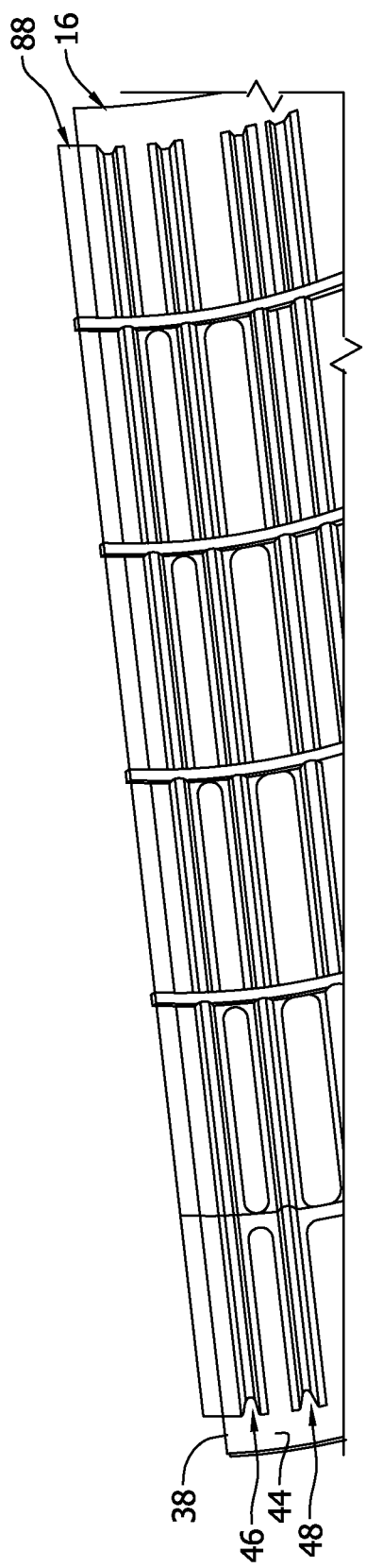
FIG. 2 is a representation of a left side top edge surface of the lower body section represented in FIG. 1 and splice straps secured along the left side top edge surface.

As represented in FIG. 1, the aircraft body section 12 is represented as being a portion of a passenger cabin of an aircraft. The upper body section 14 is provided with a plurality of window openings 42. The window openings 42 are spatially arranged longitudinally along opposite sides of the upper body section 14 just above the right side bottom edge surface 24 and the left side bottom edge surface 26. In other equivalent embodiments of the aircraft body section 12, the window openings 42 could be absent from the upper body section 14. Thus, it is not necessary that the aircraft body section 12 be a portion of a passenger aircraft with window openings 42. The aircraft body section 12 could be a freighter or cargo aircraft that would not require window openings, FIG. 2 is a representation of a perspective view of a portion of an interior surface 44 of the lower body section 16 adjacent the left side top edge surface 38 of the lower body section 16. It should be understood that the interior surface 44 of the lower body section 16 adjacent the right side top edge surface 36 of the lower body section 16 is basically a mirror image of the interior surface 44 represented in FIG. 2. As represented in FIG. 2, there are a plurality of stringers secured to the interior surface 44 of the lower body section 16. The plurality of stringers include a first stringer 46 secured to the interior surface 44 adjacent the left side top edge surface 38 of the lower body section 16, and a second stringer 48 secured to the interior surface 44 of the lower body section 16 just below the first stringer 48. The first stringer 46 and the second stringer 48, as well as the other stringers of the plurality of stringers secured to the interior surface 44 of the lower body section 16 extend longitudinally in a straight path across the interior surface 44 of the lower body section 16. The first stringer 46 and the second stringer 48 represented in FIG. 2 are "hat" stringers. Referring to the first stringer 46, the "hat" type of stringer has an intermediate raised portion 52 that extends along the longitudinal length of the first stringer 46, and flat flange portions 54, 56 on opposite sides of the raised portion 52 that extend along the longitudinal length of the first stringer 46. The flanges 54, 56 are secured to the interior surface 44 of the lower body section 16 in securing the first stringer 46 to the lower body section. The upper flange 54 of the first stringer 46 represented in FIG. 2 is secured to the interior surface 44 of the lower body section 16 with a top edge 58 of the upper flange 54 positioned adjacent and substantially parallel and coplanar with the left side top edge surface 38 of the lower body section 16.

Figure 3:
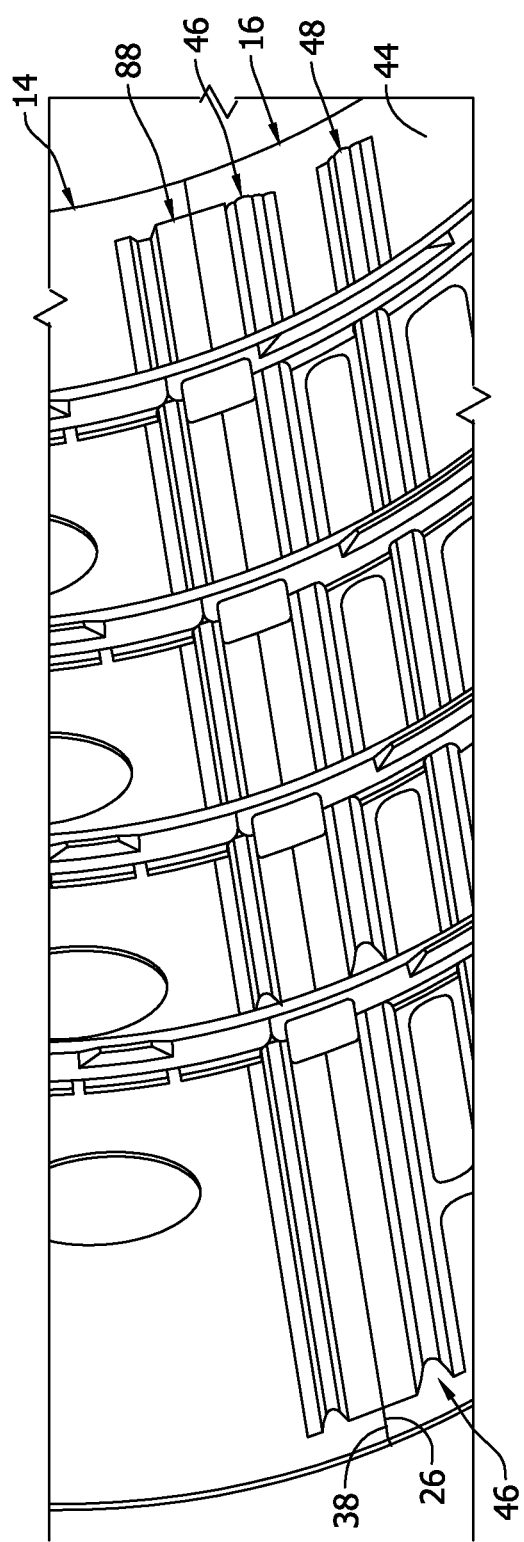
FIG. 3 is a representation of a perspective, sectioned view of a left side bottom edge surface of the upper body section of FIG. 1 and a left side top edge surface of the lower body section of FIG. 1 joined by a plurality of splice straps.

FIG. 3 is a representation of a perspective view of a portion of an interior surface 72 of the upper body section 14 adjacent the left side bottom edge surface 26 of the upper body section 14. It should be understood that the interior surface 72 of the upper body section 14 adjacent the right side bottom edge surface 24 of the upper body section 14 is basically a mirror image of the interior surface 72 represented in FIG. 3. As represented in FIG. 3, there are a plurality of stringers secured to the interior surface 72 of the upper body section 14. The plurality of stringers include a third stringer 74. The third stringer 74 is secured to the interior surface 72 of the upper body section 14 with the third stringer 74 adjacent to and extending longitudinally along the left side bottom edge surface 26 of the upper body section 14. The third stringer 74, as well as the other stringers of the plurality of stringers secured to the interior surface 72 of the upper body section 14 extend longitudinally in a straight path across the interior surface 72 of the upper body section 14. The third stringer 74 is a "hat" stringer with a raised central portion 76, a first flange or lower flange 78 below the raised portion 76 and a second flange or upper flange 82 above the raised portion. The flanges 78, 82 are secured to the interior surface 72 of the upper body section 14 in securing the third stringer 74 to the upper body section. The lower flange 78 of the stringer 76 extends along and is adjacent to the left side bottom edge surface 26 of the upper body section 14. The lower flange 78 has a flange bottom edge 84 that is positioned adjacent and substantially parallel and coplanar with the left side bottom edge surface 26 of the upper body section 14.

Figure 4:
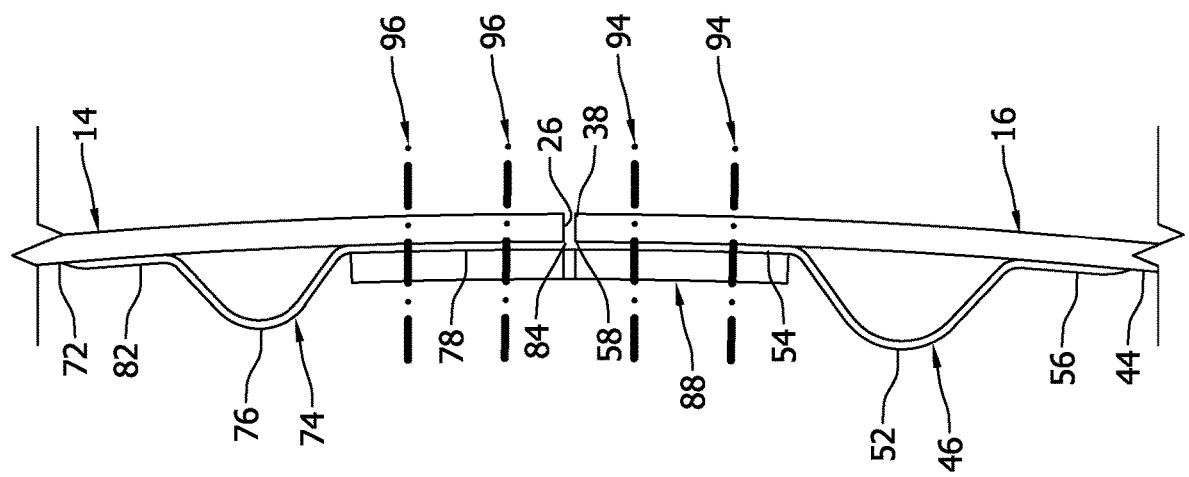
FIG. 4 is a representation of a cross-section through the left side bottom edge surface of the upper body section of FIG. 1 and the left side top edge surface of the lower body section of FIG. 1 joined by the plurality of splice straps of FIG. 1.
Figure 5:
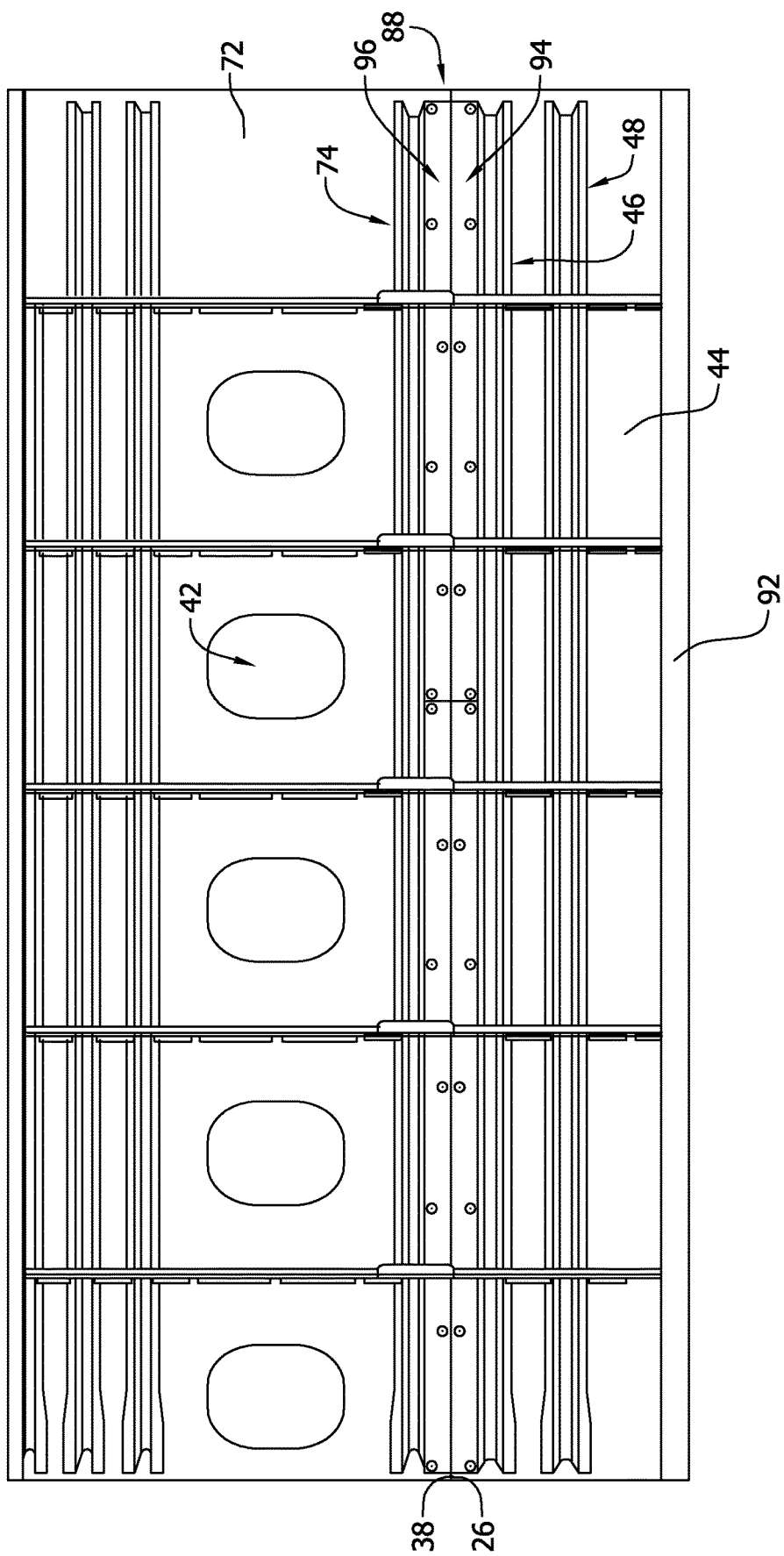
FIG. 5 is a representation of an elevation view of the left side bottom edge surface of the upper body section of FIG. 1 and the left side top edge surface of the lower body section of FIG. 1 joined by the plurality of splice straps of FIG. 1.

As represented in FIGS. 2-4, there are a plurality of splice straps 88 secured to the interior surface 44 of the lower body section 16 along the left side top edge surface 38 of the lower body section 16. As represented in FIG. 5, there is a floor surface 92 connected to the interior surface 44 of the lower body section 16. The floor surface is positioned spaced by the stringers 46, 48 below the plurality of splice straps 88. It should be understood that there are also a plurality of splice straps secured to the interior surface 44 of the lower body section 16 along the right side top edge surface 36 of the lower body section. Each of the splice straps 88 is constructed of a composite material or other equivalent material. Each splice strap 88 has an elongate rectangular configuration with a longitudinal length dimension that extends along the longitudinal length dimension of the lower body section 16, and a lateral width dimension. Lower portions or lower halves of the splice straps 88 represented in FIGS. 2-4 are secured over the upper flange 54 of the first stringer 46. The splice straps 88 are secured to the upper flange 54 of the first stringer 46 by being bonded to the upper flange 54, or being secured by fasteners 94 to the upper flange 54 and the lower body section 16, or by both being bonded and secured by fasteners. As represented in FIGS. 2-4, each of the splice straps 88 is secured to the upper flange 54 and to the lower body section 16 with the splice straps extending laterally across the upper flange 54 top edge surface 58, and laterally across the left side top edge surface 38 of the lower body section 16. The plurality of splice straps 88 are arranged extending longitudinally along the left side top edge surface 38 of the lower body section 16. The longitudinal lengths of the splice straps 62 are positioned end to end along the left side top edge surface 38 of the lower body section 16.

FIG. 3 is a representation of a perspective view of an interior surface 72 of the upper body section 14 moved adjacent the interior surface 44 of the lower body section 16 with the left side bottom edge surface 26 of the upper body section 14 positioned above and opposing the left side top edge surface 38 of the lower body section 16. As represented in FIG. 3, the plurality of splice straps 88 extend laterally across the left side bottom edge surface 26 of the upper body section 14 and across the lower flange 78 of the third stringer 74 secured to the interior surface of the upper body section 14. The plurality of window openings 42 are positioned above the plurality of splice straps 88.

The plurality of splice straps 88 extending over the lower flange 78 of the third stringer 74 are bonded to the lower flange 78 and the upper body section 14, are secured by fasteners 96 to the lower flange 78 and the upper body section 14, or are secured by bonding and fasteners to the lower flange 78 and the upper body section 14.

FIG. 4 is a representation of a cross-section view through the plurality of splice straps 88 secured to the upper flange 54 of the first stringer 48 and the lower body section 16, and secured to the lower flange 78 of the third stringer 74 and the upper body section 14. FIG. 5 is a representation of an elevation view of the plurality of splice straps 88 secured to the upper flange 54 of the first stringer 46 and the lower body section 16, and secured to the lower flange 78 of the third stringer 74 and the upper body section 14. As represented in FIG. 4, lower fasteners 94 extend through lower portions of the plurality of splice straps 88, through the upper flange 54 of the first stringer 48, and through the lower body section 16 in securing the plurality of splice straps 88 to the lower body section 16. Upper fasteners 96 extend through upper portions of the plurality of splice straps 88, through the lower flange 78 of the third stringer 74 and through the upper body section 14. The lower fasteners 94 and the upper fasteners 96 may be arranged as double rows of fasteners as represented in FIG. 4 to limit pry off, or the lower fasteners 94 and the upper fasteners 98 may be arranged as staggered, alternate rows of fasteners as represented in FIG. 5 to save weight and still limit pry off. In this manner, the plurality of splice straps 88 secured to the upper body section 14 and the lower body section 16 in positions extending over the left side bottom edge surface 26 of the upper body section 14 and the left side top edge surface 38 of the lower body section 16 secure the upper body section 14 and lower body section 16 together in constructing the aircraft body section 12.

It should be understood that there are also a plurality of splice straps extending longitudinally along the right side bottom edge surface 24 of the upper body section 14 and the right side top edge surface 36 of the lower body section 16 that are secured by fasteners to respective lower flanges and upper flanges of adjacent stringers and through the upper body section 14 and lower body section 16 on the right side of the upper body section 14 and lower body section 16 represented in FIG. 1 in securing the upper body section 14 to the lower body section 16 in constructing the aircraft body section 12.

Additionally, the end to end positioning of the plurality of splice straps 88 along the left side bottom edge surface 26 of the upper body section 14 and along the left side top edge surface 38 of the lower body section 16 creates a safety feature that prevents the propagation of a crack in the splice straps 88 longitudinally along the end to end arrangement of the splice straps. Should a crack form in one of the splice straps 88, the crack could progress through the splice strap until it reaches one or both of the longitudinally opposite edges of the splice strap. The segmented, end to end longitudinal arrangement of the splice straps 88 will prevent any crack forming in one of the splice straps from propagating into a longitudinally adjacent splice strap.

As various modifications could be made in the construction of the upper aircraft body section and lower aircraft body section and the splice straps joining the body sections herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

The invention claimed is:

1. An aircraft body comprising:
an upper body section having a right side bottom edge surface and a left side bottom edge surface, and a curved cross-section configuration that extends between the right side bottom edge surface and the left side bottom edge surface of the upper body section, wherein the upper body section defines a plurality of window openings;
a lower body section having a right side top edge surface and a left side top edge surface, and a curved cross-section configuration that extends between the right side top edge surface and the left side top edge surface of the lower body section, wherein the window openings are entirely above the right side top edge surface and the left side top edge surface of the lower body section, such that none of the window openings are present in the lower body section;
the right side bottom edge surface of the upper body section being positioned above and opposing the right side top edge surface of the lower body section;
the left side bottom edge surface of the upper body section being positioned above and opposing the left side top edge surface of the lower body section;
a plurality of splice straps secured between the upper body section and the lower body section, extending across the right side bottom edge surface of the upper body section and the right side top edge surface of the lower body section, and extending across the left side bottom edge surface of the upper body section and the left side top edge surface of the lower body section, wherein the window openings are positioned entirely above the splice straps.

2. The aircraft body of claim 1, wherein the plurality of splice straps are secured to a respective interior surface of the upper body section and the lower body section.

3. The aircraft body of claim 2, further comprising:
a floor surface connected to the interior surface of the lower body section, the floor surface being positioned below the plurality of splice straps.

4. The aircraft body of claim 1, further comprising:
upper stringers secured to the interior surface of the upper body section, the upper stringers having lengths that extend across the interior surface of the upper body section between the plurality of splice straps secured to the interior surface of the upper body section and the plurality of window openings.

5. The aircraft body of claim 4, wherein:
the upper stringers include flanges secured to the interior surface of the upper body section;
the plurality of splice straps are secured to the flanges; and
the flanges positioned between the plurality of splice straps and the interior surface of the upper body section.

6. The aircraft body of claim 3, further comprising:
lower stringers secured to the interior surface of the lower body section, the lower stringers having lengths that extend across the interior surface of the lower body section between the plurality of splice straps secured to the interior surface of the lower body section and the floor surface.

7. The aircraft body of claim 6, wherein:
the lower stringers include flanges secured to the interior surface of the lower body section,
the plurality of splice straps are secured to the flanges; and
the flanges positioned between the plurality of splice straps and the interior surface of the lower body section.

8. The aircraft body of claim 2, wherein each the splice straps are positioned end to end such that the plurality of splice straps extend along the right side bottom edge surface of the upper body section and the right side top edge surface of the lower body section, and the plurality of splice straps also extend along the left side bottom edge surface of the upper body section and the left side top edge surface of the lower body section.

9. The aircraft body of claim 1, further comprising:
a plurality of fasteners extending through the plurality of splice straps, through the upper body section, and through the lower body section, wherein the plurality of fasteners connect the plurality of splice straps between the upper body section and the lower body section.

10. An aircraft body comprising:
an upper body section having a right side bottom edge surface and a left side bottom edge surface, a longitudinal length dimension, and a lateral width dimension, the longitudinal length dimension and the lateral width dimension being mutually perpendicular, and a curved cross-section configuration that extends laterally across the upper body section between the right side bottom edge surface of the upper body section, the right side bottom edge surface extending along the longitudinal length dimension of the upper body section, and the left side bottom edge surface of the upper body section, the left side bottom edge surface extending along the longitudinal length dimension of the upper body section, wherein the upper body section defines a plurality of window openings;
a lower body section a right side top edge surface and a left side top edge surface, a longitudinal length dimension, and a lateral width dimension, the longitudinal length dimension and the lateral width dimension being mutually perpendicular, and a curved cross-section configuration that extends laterally across the lower body section between a right side top edge surface of the lower body section, the right side top edge surface extending along the longitudinal length dimension of the lower body section, and a left side top edge surface of the lower body section, the left side top edge surface extending along the longitudinal length dimension of the lower body section, wherein the window openings are located entirely above the left side top edge surface and the right side top edge surface of the lower body section such that none of the window openings are present in the lower body section;
the right side bottom edge surface of the upper body section being positioned above and opposing the right side top edge surface of the lower body section;
left side bottom edge surface of the upper body section being positioned above and opposing the left side top edge surface of the lower body section;
a plurality of splice straps secured between the upper body section and the lower body section, extending across the right side bottom edge surface of the upper body section and the right side top edge surface of the lower body section, and extending across the left side bottom edge surface of the upper body section and the left side top edge surface of the lower body section, wherein the window openings are positioned entirely above the splice straps;
the plurality of splice straps being positioned end to end such that the splice straps extend longitudinally along the right side bottom edge surface of the upper body section and the right side top edge surface of the lower body section, and such that the splice straps extend longitudinally along the left side bottom edge surface of the upper body section and the left side top edge surface of the lower body section.

11. The aircraft body of claim 10, further comprising:
a plurality of fasteners extending through the plurality of splice straps, through the upper body section, and through the lower body section, the plurality of fasteners connecting the plurality of splice straps between the upper body section and the lower body section.

12. The aircraft body of claim 11, wherein the plurality of fasteners extend through the plurality of splice straps secure the plurality of splice straps to an interior surface of the upper body section, and the plurality of fasteners extend through the plurality of splice straps to secure the plurality of splice straps to an interior surface of the lower body section, thereby such that the plurality of fasteners secure the upper body section to the lower body section.

13. The aircraft body of claim 10, further comprising:
a floor surface connected to an interior surface of the lower body section, the floor surface extending across the curved cross-section configuration of the lower body section, wherein the floor surface is positioned below the plurality of splice straps.

14. The aircraft body of claim 13, wherein the plurality of window openings are positioned in a longitudinal row across a right side of the upper body section above the plurality of splice straps, and arranged in a longitudinal row across a left side of the upper body section above the plurality of splice straps.

15. The aircraft body of claim 14, further comprising:
upper stringers secured to the interior surface of the upper body section, the upper stringers extending longitudinally across the interior surface of the upper body section on the right side of the upper body section between i) the splice straps secured to the interior surface of the upper body section on the right side of the upper body section and, ii) the plurality of window openings through the upper body section on the right side of the upper body section, wherein each respective one of the upper stringers extends longitudinally across the interior surface of the upper body section on the left side of the upper body section between i) the plurality of splice straps secured to the interior surface of the upper body section on the left side of the upper body section, and ii) the plurality of window openings through the upper body section on the left side of the upper body section.

16. The aircraft body of claim 15, wherein the upper stringers include flanges secured in surface engagement to the interior surface of the upper body section, and wherein the plurality of splice straps are secured in surface engagement to the flanges of the upper stringers with the flanges positioned between the splice straps and the interior surface of the upper body section.

17. The aircraft body of claim 13, further comprising:
lower stringers secured to the interior surface of the lower body section on a right side of the lower body section, the lower stringers extending longitudinally across the interior surface of the right side of the lower body section between the plurality of splice straps secured to the interior surface of the lower body section and the floor surface; and
lower stringers secured to the interior surface of the lower body section on a left side of the lower body section, the lower stringers extending longitudinally across the interior surface of the left side of the lower body section between the plurality of splice straps secured to the interior surface of the lower body section and the floor surface.

18. The aircraft body of claim 17, wherein the lower stringers include flanges that are secured in surface engagement to the interior surface of the lower body section, and the plurality of splice straps are secured in surface engagement to the flanges of the lower stringers with the flanges of the lower stringers positioned between the plurality of splice straps and the interior surface of the lower body section.

19. A method of constructing an aircraft body comprising:
constructing an upper body section with a curved cross-section configuration that extends between a right side bottom edge surface of the upper body section and the left side bottom edge surface of the upper body section, including forming a plurality of window openings in the upper body section;
constructing a lower body section with a curved cross-section configuration that extends between a right side top edge surface of the lower body section and a left side top edge surface of the lower body section, wherein the window openings are entirely above the left side top edge surface and the right side top edge surface of the lower body section, such that none of the window openings are present in the lower body section;
positioning the right side bottom edge surface of the upper body section above and opposing the right side top edge surface of the lower body section;
positioning the left side bottom edge surface of the upper body section above and opposing the left side top edge surface of the lower body section; and
securing a plurality of splice straps between the upper body section and the lower body section, with the plurality of splice straps extending across the right side bottom edge surface of the upper body section and the right side top edge surface of the lower body section, and extending across the left side bottom edge surface of the upper body section and the left side top edge surface of the lower body section.

20. The method of claim 19, further comprising:
positioning a floor surface below the plurality of splice straps and extending across the curved cross-section configuration of the lower body section; and
connecting the floor surface to an interior surface of the lower body section.

* * * * *